United States Patent

[11] 3,604,572

| [72] | Inventors | Gunter Strocker<br>Holzwickede;<br>Gerhard Fischer, Dortmund-Kirchhorde, both of, Germany |
|---|---|---|
| [21] | Appl. No. | 795,873 |
| [22] | Filed | Feb. 3, 1969 |
| [45] | Patented | Sept. 14, 1971 |
| [73] | Assignee | Gustav Schade Maschinenfabrik |
| [32] | Priority | Feb. 12, 1968 |
| [33] | | Germany |
| [31] | | Sch 44248 |

[54] COMBINED EQUIPMENTS FOR BUILDING UP AND CLEARING DUMPS OF BULK MATERIALS
6 Claims, 5 Drawing Figs.

[52] U.S. Cl. .................................................... 214/10, 198/36
[51] Int. Cl. .................................................. B65g 65/28
[50] Field of Search............................................ 214/10, 15 D, 15 E; 198/36, 101, 186; 37/191, 192

[56] References Cited
UNITED STATES PATENTS

| 855,744 | 6/1907 | Argall.......................... | 198/100 X |
| 1,192,016 | 7/1916 | Stuart........................... | 198/101 |
| 3,314,525 | 4/1967 | Krause et al. ................. | 198/186 X |

FOREIGN PATENTS

| 1,112,456 | 8/1961 | Germany...................... | 214/10 |
| 580,192 | 7/1933 | Germany...................... | 214/15 D |
| 648,720 | 11/1962 | Italy ............................ | 214/10 |

Primary Examiner—Gerald M. Forlenza
Assistant Examiner—Frank E. Werner
Attorney—Meyer, Tilberry and Body ABSTRACT: A device for piling and unpiling bulk material includes a frame having spaced-apart base portions and legs extending upwardly toward one another from said base portions, a feeder conveyor is mounted on the frame for piling material in the space spanned by the base portions. The device includes a scraper boom for removing piled material from the area spanned by the base portions. An additional conveyor may be provided for receiving material from the scraper boom and for supplying material to the feeder conveyor by means of a trolley.

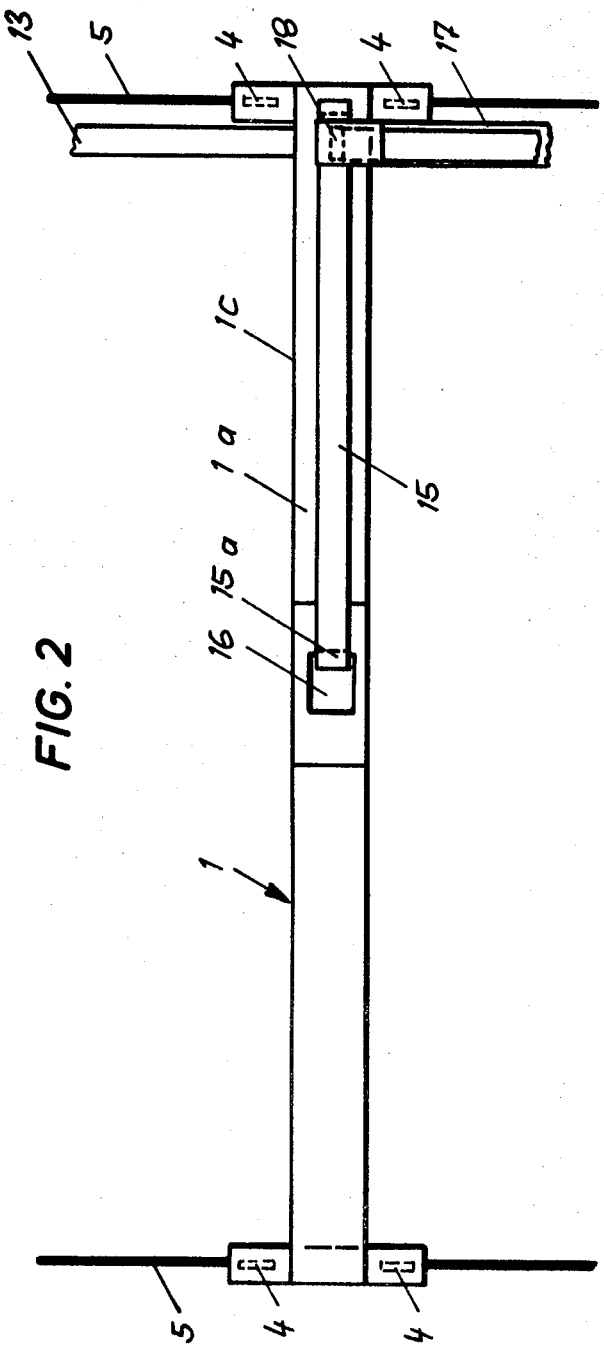

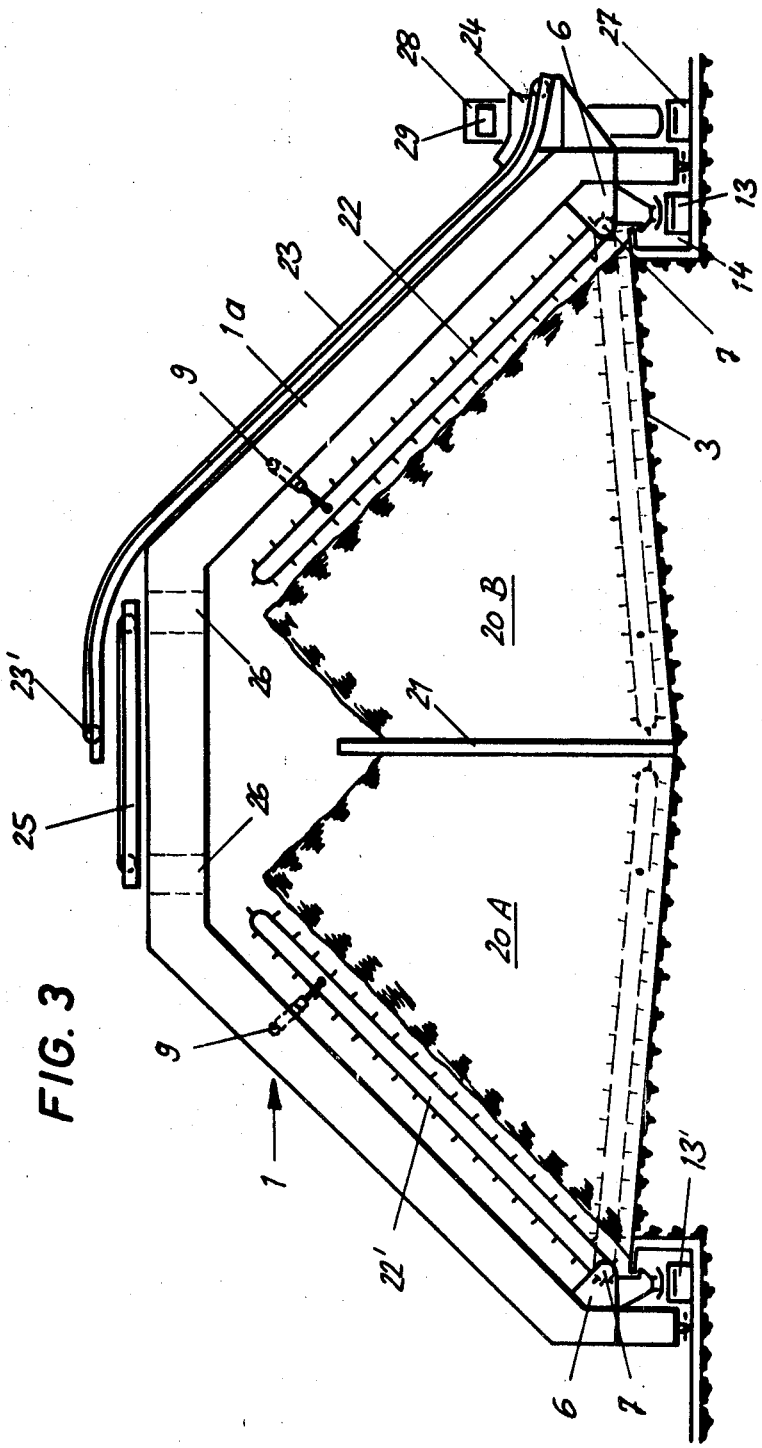

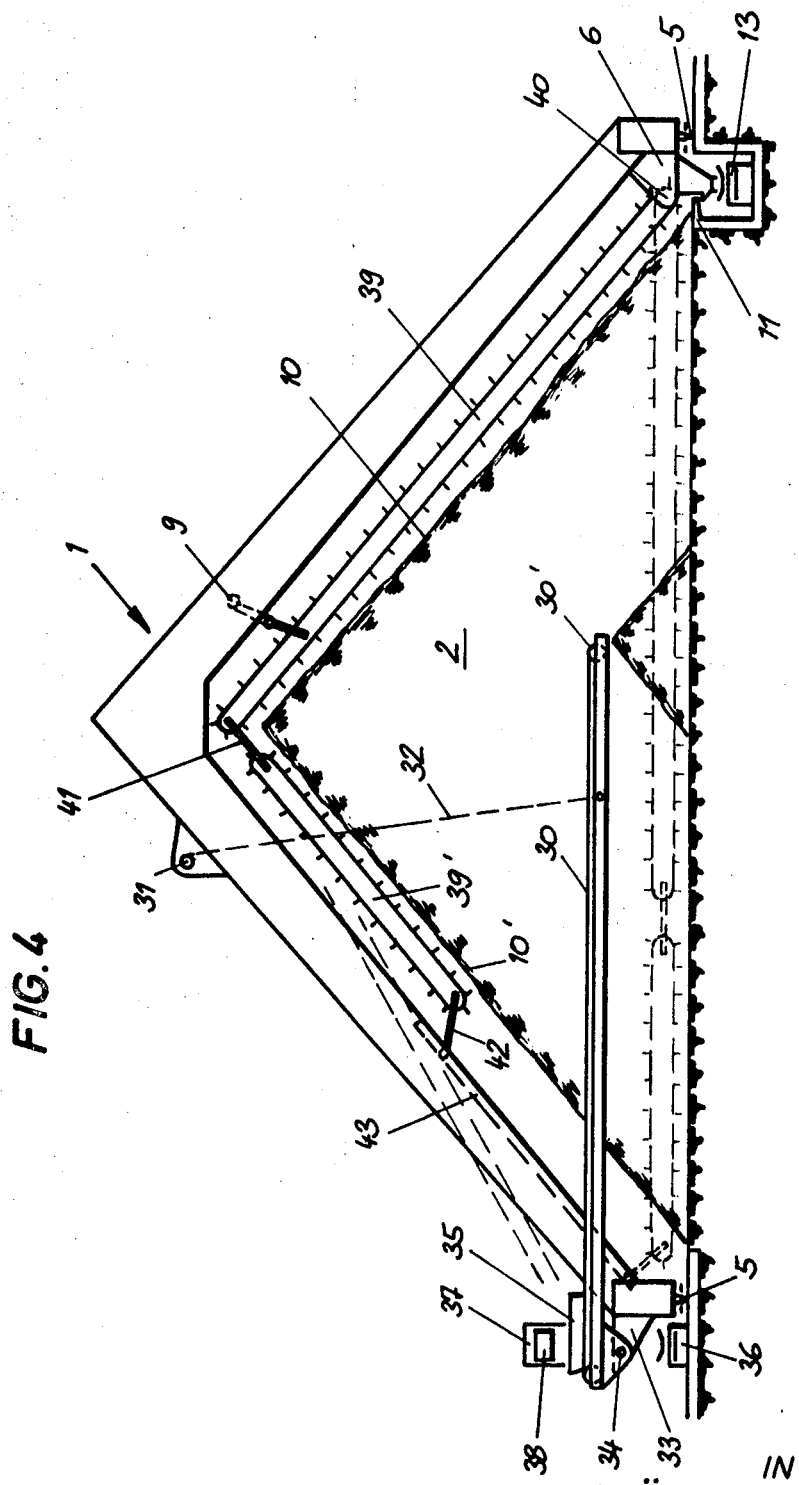

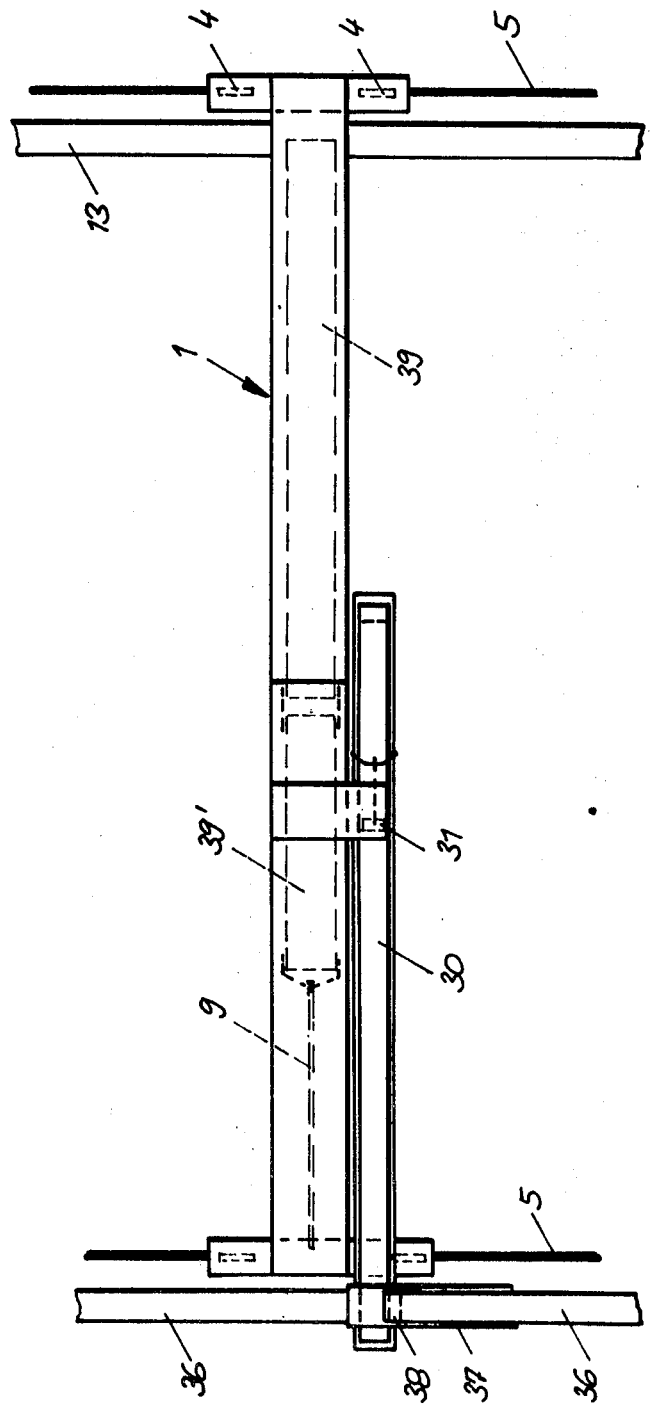

COMBINED EQUIPMENTS FOR BUILDING UP AND CLEARING DUMPS OF BULK MATERIALS

The present invention relates to a combined equipment for building up and clearing dumps of bulk materials, which equipment possesses at least one vertically pivoting scraper boom for clearing purposes, and a conveyor feeding material to the dump.

In order to clear bulk material from silos or dumps, in addition to excavators, bucket cranes, mechanical shovels and other means, scraper loaders are often used. Scraper loaders, in addition to the advantage of a continuous mode of operation, also present the advantages that the scraper booms they are equipped with have a large range of operation, and that using these devices it is possible at the same time that the material is cleared to mix various kinds of bulk materials which are stored in layers on top of one another. Also, using scraper loaders, stored bulk materials which have solidified can be broken up without any difficulty and fed out in fine granular form.

Known scraper loaders using a scraper boom, have been used exclusively to clear stored bulk materials. In order to build up the material store, i.e. to feed bulk materials into a storage location, special feed mechanisms, e.g. tipping gear (open-air dumps or tips) or feed conveyors (in silos) are used. The necessity to provide special equipment for the feeding in and clearing of the bulk materials, means a high outlay in mechanical equipment and correspondingly high installation and operating costs.

In order to overcome these drawbacks, already combined equipments for feeding in and clearing bulk materials, have been proposed. One known equipment of this kind consists of a scraper loader which in addition to the scraper boom, is fitted with a feeder boom carrying a continuous conveyor such as a belt conveyor, the feeder boom being mounted on the scraper loader at 180° to the scraper boom. The scraper boom and the feeder boom are in this context arranged upon a common frame (able to slew about a vertical axis) on the chassis of the loader.

Also known, is a feeder and clearing equipment the chassis of which carries a scraper boom which can be employed simultaneously to feed in bulk material. To this end, the top run of the scraper belt arranged on the boom is for example designed as a chain-operated bucket conveyor. On the other hand, the scraper boom may also carry a belt conveyor serving to feed in bulk material, which is therefore pivotable along with the boom itself.

These known combined equipments, with scraper booms, are designed to travel on two rails laid at one side of a dump. In order to achieve adequate stability in these equipments, this rail track laid at one side of the dump must have a very wide gauge. The amount of space occupied by these combined equipments is therefore relatively large, especially since the scraper loader, because of the need for a counterweight overhanging at the side opposite the boom, is inevitably a relatively wide construction. These equipments are accordingly not suited for operation in conditions of limited space, in particular in enclosed storage spaces.

The aim of the present invention is to create a comparatively simply constructed equipment for feeding and clearing bulk materials, which occupies substantially less space than the known kinds of combined equipments and is therefore advantageously applicable to work in enclosed spaces (warehouses, etc.).

In accordance with the invention, the feeder conveyor belt is mounted on a travelling frame which spans the dump, to which frame the scraper boom is articulatingly attached in the conventional way.

The feeder conveyor can be mounted statically on the frame, for example on the top thereof, or can be mounted on one side of the frame leg. It is possible to arrange for the feeder conveyor to be followed by a reversing conveyor arranged on top of or at be followed by a reversing conveyor arranged on top of or at the top of the frame. The feeder conveyor and/or reversing conveyor can discharge the bulk materials through an opening or openings in the top of the frame, onto the dump. Preferably, the arrangement will be one in which the frame has a leg inclined from the base of the dump towards the top thereof, to or upon which the feeder conveyor is attached, thus feeding the bulk material up towards the top of the frame. Conveniently, in this context an arrangement will be used in which the feeder conveyor is arranged at or upon the inclined leg of the frame and extends from a position in the neighborhood of the base of the dump, up to the top of the frame. Where the frame or dump height is large, conveniently a conveyor belt or the like which is specially designed to cope with feeding bulk material up steep grades, will be used.

In accordance with a further essential feature of the invention, the feeder conveyor will be mounted to pivot about a point at its rear, the pivot bearing for the feeder conveyor or the boom carrying it, preferably being arranged on a bracket carried at that side of the frame facing away from the slope of the dump. It is advisable for the pivot bearing of the conveyor belt or boom carrying it, to be arranged near the base of the dump so that the point of introduction onto the feeder conveyor is at a very low height above the base of the dump.

The introduction of the bulk material for storage, onto the feeder conveyor, can be effected through the medium of a conveyor belt arranged along the length of the dump, which conveyor belt is raised, possible through the medium of a known kind of belt trolley and in the neighborhood of the frame, above the level of the point of entry onto the feeder conveyor carried by the frame so that it discharges the bulk material onto said feeder conveyor. Equally, however, it is possible to employ for the charging of the feeder conveyor carried by the frame, the discharge conveyor belt associated with the scraper boom or booms, which discharge conveyor in this case must likewise be so deflected using a belt trolley, that the input bulk material is discharged onto the feeder conveyor via an injector drum on said trolley.

The invention will now be described with reference to the accompanying drawings which illustrate the invention but in no restrictive sense.

FIG. 2 is the equipment of FIG. 1, in plan;

FIG. 3 is a second embodiment of the equipment in accordance with the invention in elevation;

FIG. 4 is a third embodiment of the equipment in accordance with the invention, in elevation;

FIG. 5 illustrates the equipment of FIG. 4, in plan.

Figure 1:
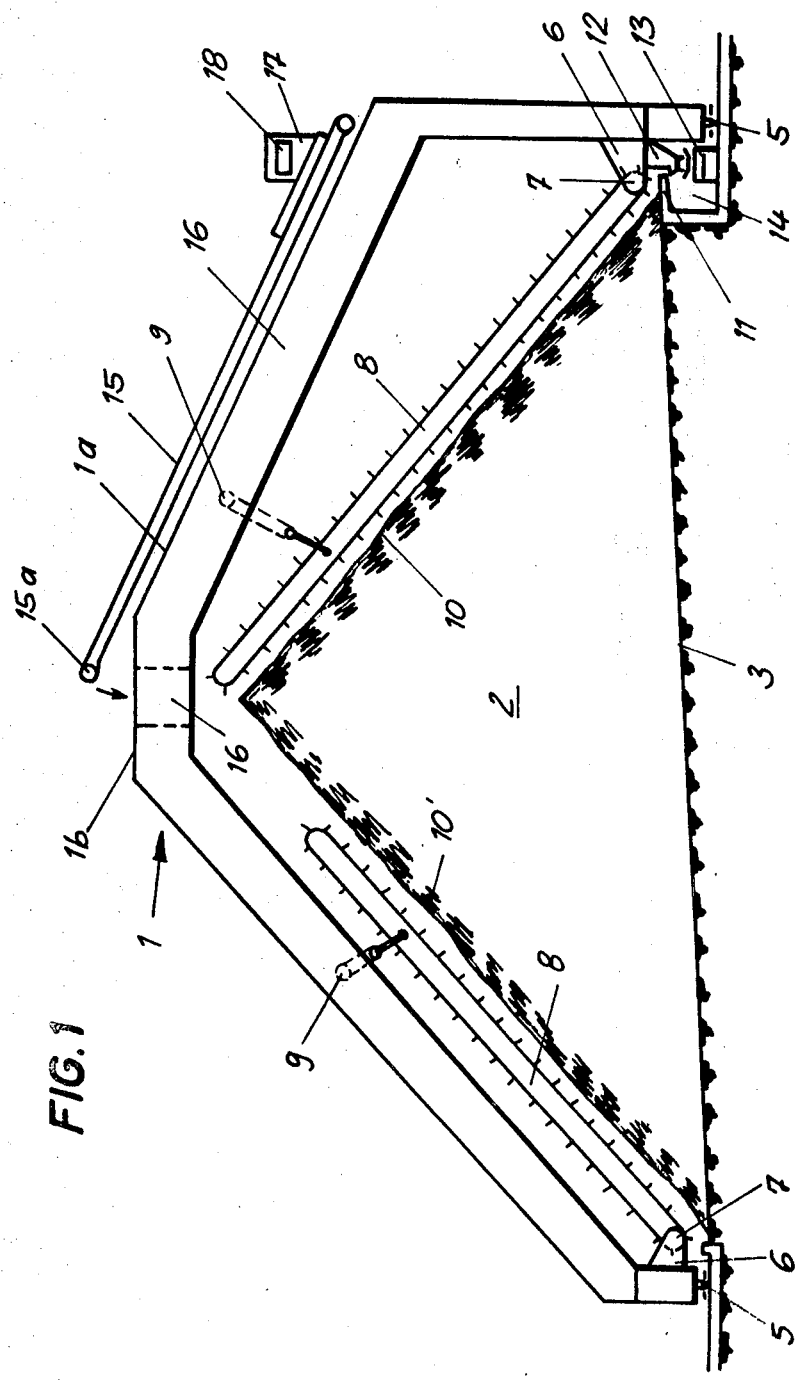
FIG. 1 illustrates a first embodiment of the equipment in accordance with the invention, in elevation.

The combined feeder and clearing equipment of FIGS. 1 and 2, incorporates a frame 1 which spans the full dump 2 and can be transversed, at either side of the dump and in the neighborhood of the base 43 thereof, through the medium of wheels 4 running on rails 5. In the neighborhood of the two bottom edges of the dump, respective scraper booms 8 and 8' are mounted at either side of the frame on brackets 6 and pivot about a horizontal pin 7. The two booms 8 and 8' each have a set of lifting gear 9 consisting of a cable which with block and tackle arrangements, so that they can be pivoted in the vertical plane together or independently of one another. The booms are located in a common vertical plane. The shorter boom 8' scrapes the bulk material up the slope 10' during the clearing phase, so that the material is picked up by the scraper boom 8 working the other slope 10, thus moving it down said slope 10 over a platform 11 formed on the dump footing wall, into a feed hopper 12 onto a conveyor belt 13 which transports it away. The conveyor belt 13 is located in a trench 14 below the level of the base of the dump to one side of the rail 5 also laid at this side of the dump.

It will be immediately apparent that using the two scraper booms 8 and 88', the whole width of the dump 2 can be reached and cleared. In addition, the clearing operation can be carried out without giving rise to the development of any overhang formations. Generally speaking, it is advisable first of all to clear the dump to such an extent using the boom 8 working the slope 10, until this boom has sunk a certain amount below the raised boom 8'. During the further course of the clearing operation, the two booms 8 and 8' then cooperate with one another and, as already mentioned, the boom 8' feeds the bulk material up the slope 10' to the boom 8. During the clearing operation, the frame 1 traverses along the dump 2 and after each pass the boom or booms is or are lowered in each case by an amount corresponding to the depth of penetration of the rakes.

On the top of the frame leg 1a which is inclined at an angle of between 15° and 25°, a feeder conveyor belt 15 is arranged. The feeder conveyor 15, statically mounted on the frame leg, thus feeds the incoming bulk material at an angle of 15° to 25° up to the top or crossmember 1b of the frame, where it is discharged over the end roller 15a of the conveyor. The material falls through an aperture 16 in the crossmember of the frame, onto the dump.

It is of course entirely possible to arrange the feeder conveyor 15 on the side face 1c of the leg 1a of the frame, instead of on the top of it.

The top run of the conveyor belt 13 is so raised in the neighborhood of the frame 1, by means of a known kind of belt trolley 17, that it passes over an ejector drum 18 on said trolley, which drum is positioned over the point of discharge onto the feeder belt 15. The belt 13 can therefore simultaneously be used to feed in the material being docked.

In FIG. 3, a double dump 20A and 20B is illustrated, the two parts of which are separated from one another by a partition wall 21 located in the center of the dump site and extending along the length of the dump. The frame 1 is provided at both sides with respective scraper booms 22 and 22', the boom 22 clearing the bulk material from the dump 20B and the other boom 22' doing the same for dump 20A. The two scraper booms are of the same length; they are each pivotally mounted on a bracket 6 so as to swing about a horizontal pin 7. The references 9 indicate he lifting gear associated with each of the booms.

Statically mounted upon the leg 1a of the frame, is a special conveyor belt 23 for steep angle working, the point of entry 24 of which is at a short interval above the base 3 of the dump, and whose ejector drum 23' is arranged above the crossmember of the frame, over a reversing conveyor belt 25, the latter, all in accordance with the direction in which it is running, feeding the bulk material either onto the dump 20A or onto the dump 20B. At both points of discharge from the reversing conveyor 25, the frame 1 contains an appropriate opening 26.

The feeder conveyor 23, designed specially for steep angle working, moves the material upwards at an angle of between 30° and 60°. In the conveyor trench 14, the output conveyor belt 13 is arranged, at one side of the rail 5, and at the other side of the rail a conveyor 27 is located via which the incoming bulk material is supplied. The top run of the belt 27 is raised and deflected by means of a belt trolley 28, to such a level and in such a way that the bulk material is discharged from the drum 29 into the feed hopper 24 for the feeder conveyor 23.

The scraper boom 22' at one side of the frame scrapes the bulk material from dump 20A onto an associated output conveyor 13'.

In the embodiment of FIG. 3, as well, the feeder conveyor 23 can be located on the side of the frame leg, if required.

In FIGS. 4 and 5, a combined equipment in accordance with the invention has been illustrated, in which the feeder conveyor 30 is arranged to pivot in the vertical plane about a point near the base of one leg of the frame, a winch 31 and cable 32 forming the lifting gear for this function. At the base of the frame, in this case there is attached at the side facing away from the slope of the dump, a bracket 33 to which the end of the feeder conveyor 30 is articulatingly fitted through the medium of the bearing arrangement 34. The feeder conveyor 30 has a length such that its discharge drum 30' at the free end of the boom, is located above the center of the dump in the fully raised condition.

At the point of entry to the feeder conveyor 30, a feed hopper 35 is arranged. A conveyor belt 36 located beneath the point of entry and extending in the longitudinally direction of the dump, introduces the material which is to be dumped. The top run of this conveyor is raised above the feed hopper 35 by means of a belt trolley 37, so that the bulk material is discharged from the drum 38 of the trolley onto the feeder conveyor 30 which is arranged upon a pivoting boom or itself constitutes such pivoting boom.

At the other side, near the base of the dump a folding boom 39 is pivotally mounted to swing about a horizontal joint 40, the boom section 39' connected to it at the link position 41 being guided through a guide element 42 in a guide 43 formed in the frame leg at this point. The boom section 39' works the slope 10' of the dump, moving the material up the slope to the top where it is picked up by the scraper boom 39 and fed down to the conveyor 13. The lifting gear for the folding boom is marked 9. As FIG. 5 shows, the feeder conveyor 30 is located directly to one side of the frame leg.

We claim:

1. A device for piling and unpiling bulk material comprising; frame means having spaced-apart base portions adapted to be movably mounted on opposite sides of a storage area for bulk material, said frame means having leg means extending upward toward one another from said base portions and spanning said storage area, scraper boom means pivotally attached to said frame means for pivotal movement in a vertical plane for scraping bulk material from a storage pile located between said base portions and discharging such bulk material onto a conveyor extending in the direction of movement of said frame means, feeder conveyor means on said frame means for movement therewith along an area for storage of bulk material, said feeder conveyor means being independent of said scraper boom means and having a discharge means for feeding bulk material to the area spanned by said base portions from a conveyor which supplies bulk material from an area outside of the area spanned by said base portions, said feeder conveyor means being pivotally mounted on said frame means for pivotal movement in a substantially vertical plane, and each of said scraper boom means and said feeder conveyor means being pivotally movable independently of one another.

2. The device of claim 1, wherein said frame means includes side face means and said feeder conveyor means is pivotally connected to said side face means for pivotal movement in a vertical plane parallel to the plane in which said scraper boom means is pivoted.

3. The device of claim 2 and further including support means mounted on said frame means outside of the area spanned by said base portions of said frame means, said feeder conveyor means being pivotally mounted on said support means.

4. The device of claim 1, and further including support means mounted on said frame means outside of the area spanned by said base portions of said frame means, said feeder conveyor means being pivotally mounted on said support means.

5. The device of claim 4, wherein said feeder conveyor means is pivotally connected to said support means adjacent said base portions of said frame means and above the base of the storage area spanned by said base portions.

6. The device of claim 1, wherein said feeder conveyor means is pivotally connected to said frame means adjacent said base portions thereof and above the base of the storage area spanned by said base portions.